UNITED STATES PATENT OFFICE.

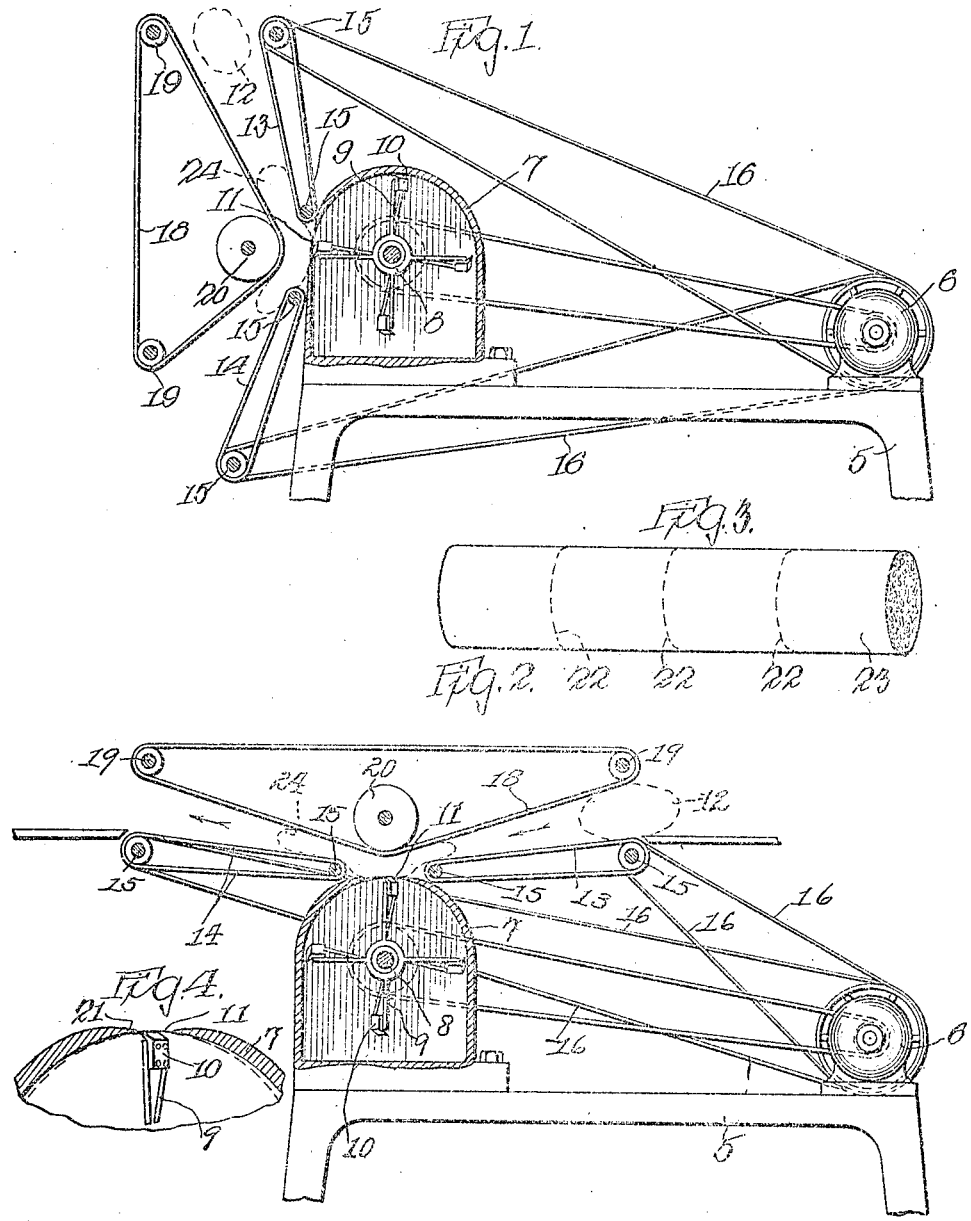

JOSEPH ELLIS, OF CHICAGO, ILLINOIS, ASSIGNOR TO FEATHEREDGE RUBBER COMPANY, OF CHICAGO, ILLINOIS, A CORPORATION OF ILLINOIS.

SPONGE-TRIMMING MACHINE.

1,291,811.

Specification of Letters Patent.

Patented Jan. 21, 1919.

Application filed October 30, 1916. Serial No. 128,384.

*To all whom it may concern:*

Be it known that I, JOSEPH ELLIS, a citizen of the United States, residing at Chicago, in the county of Cook and State of Illinois, have invented certain new and useful Improvements in Sponge-Trimming Machines, of which the following is a specification.

My invention relates to machines for trimming rubber sponges, and the like. In the manufacture of rubber sponges, a quantity or lump of raw rubber compound suitable for making rubber sponges is vulcanized in an oven or otherwise, as desired. After the material has been vulcanized, it is passed through some mechanical means to force the imprisoned gases from the vulcanized material and to break the walls between each of the cells which contained the imprisoned gases. During vulcanization the outer surface of the lump or quantity of material has a skin or coat formed on it. This skin or coat is not sufficiently punctured during the breaking of the cell walls to permit the ready ingress and egress of water, and the like, to the sponge in use. Therefore, it is necessary to trim off this skin or coat from the outer surface of the sponge.

The purpose of my invention is the provision of a simple and efficient device which will effectively trim off this skin or covering from the sponge. Other objects will appear hereinafter.

An embodiment of my invention is illustrated in the accompanying drawing forming a part of this specification, and in which—

Figure 1 is a broken side view of a machine for trimming off the skin or covering of sponges which embodies my invention.

Fig. 2 is a similar view of a machine of the same kind of slightly different form.

Fig. 3 is a perspective view of a length of a rubber sponge before it is trimmed; and Fig. 4 is an enlarged detail section showing a portion of the cutting knife and a section of the knife casing.

Referring more particularly to the drawing, I provide a base 5, upon which is mounted an electric motor 6. The electric motor 6 may be substituted by any source of power if so desired. On the base 5, I provide a hollow casing 7, in which is journaled a shaft 8. On the shaft 8 is mounted a rotary knife member 9, having a plurality of blades 10. The knife blades 10 are preferably each set with one end slightly ahead of the other in order to have a shearing effect in its operation.

At one side of the casing I provide a narrow slot 11 which is very close to the line of travel of the outer edges of the blades 10. In Fig. 1, I have shown the slot 11 in one of the vertical sides of the casing 7, and in Fig. 2, I have shown this slot at the top of the casing 7. It will appear from this that the slot 11 may be made in any desirable portion of the casing 7.

Any desirable means may be used for holding the sponges while they are being trimmed. I have shown endless conveyers arranged to do this. In the form shown, a belt conveyer 13 is mounted with its discharging end at one side of the slot 11, and a conveyer 14 is mounted with its receiving end at the other side of said slot. The conveyers 13 and 14 are mounted on suitable pulleys 15, and the latter driven by endless belts 16 from motor. The belts 16 are so arranged with respect to the motor that the outer runs of conveyer belts 13 and 14 travel downwardly in Fig. 1, and in the directions of the arrows in Fig. 2 to carry the sponges across the slot 11.

I have shown an endless conveyer 18 spaced from conveyers 13 and 14, and mounted on pulleys 19 and 20. The pulley 20 is preferably positioned directly opposite and substantially parallel with the slot 11. The two pulleys 19 are preferably so situated that the belt 18 will coöperate with the belts 13 and 14 to pass the sponges across the slot 11. The pulley 20 is also situated so that the sponges 12 are pressed firmly against the casing, and owing to the yieldable nature of the sponge, portions of its outer surface will be pressed through the slot into the path of travel of the knife blades 10. As the blades 10 revolve, chips will be taken off of the skin or outer surface of the sponge to trim the latter. The blades 10 sometimes have a tendency to pull the sponges into the casing 7 through the slot 11. In order to overcome this, I preferably form a knife 21 at one side of the slot 11 on the casing 7 to coöperate with the blades 10 in shearing off the skin or covering of the sponge.

In practice, the sponges are made in a long strip or roll, as indicated in Fig. 3, and cut into short portions, as indicated by the dotted lines 22 in Fig. 3. It is these short portions that are passed through the trimming machine. The small portions of sponge 12 are preferably placed between conveyers 13 and 18 with their axes substantially parallel with the axes of the pulleys over which the conveyers run. The conveyers hold the sponge and prevent the latter from being drawn into the slot 11. These conveyers also squeeze it into substantially the shape shown at 24, in Figs. 1 and 2, so that while the knives are operating upon the surface of the sponge, the latter can be held securely. These conveyers also pass the sponges gradually across the slot 11 and effectively trim off the skin or covering from the sponge, leaving the outer surface of the sponge smooth.

While I have illustrated and described the preferred form of my invention, I do not desire to be limited to the precise details set forth, but desire to avail myself of such variations and changes as come within the scope of the appended claims.

I claim:—

1. A trimming machine comprising a casing having a slot therein; a knife mounted in the casing adjacent the slot; a conveyer having its discharge end adjacent one side of said slot; a conveyer having its receiving end adjacent the other side of said slot; and a conveyer spaced from the first-and second-mentioned conveyers adapted to press parts of articles to be trimmed between the adjacent ends of the first and second-mentioned conveyers through said slot and into operative engagement with the knife.

2. A sponge trimming machine comprising a casing having a slot therein; a stationary knife adjacent one side of said slot; a rotary knife in the casing coöperating with said stationary knife; a conveyer having its discharge end adjacent one side of said slot; a conveyer having its receiving end adjacent the other side of said slot; and a conveyer spaced from the first and second-mentioned conveyers adapted to press articles to be trimmed between the adjacent ends of the first and second-mentioned conveyers into engagement with said casing adjacent the slot to press parts of said work through said slot into operative engagement with the knife.

3. A sponge trimming machine comprising a casing having a slot therein; cutting means in said casing adjacent said slot; a belt conveyer having its discharge end adjacent one side of said slot; a belt conveyer having its receiving end adjacent the other side of said slot, a belt conveyer having one run thereof extending along and spaced from one run of each of the first two mentioned belt conveyers and extending across said slot; and a pulley engaging one run of the third mentioned belt conveyer holding such run against movement in a direction away from said slot.

In testimony whereof I have signed my name to this specification, on this 26th day of October, A. D. 1916.

JOSEPH ELLIS.